United States Patent [19]

Tharp et al.

[11] 4,243,521
[45] Jan. 6, 1981

[54] METHOD AND APPARATUS FOR AEROBICALLY TREATING WASTEWATER

[75] Inventors: Charles E. Tharp, Lake Saint Louis; Clark M. Campbell, Columbia, both of Mo.

[73] Assignee: Environmental Dynamics, Inc., Columbia, Mo.

[21] Appl. No.: 28,051

[22] Filed: Apr. 9, 1979

[51] Int. Cl.³ .................................................. C02F 3/20
[52] U.S. Cl. ................................. 210/626; 210/195.3; 210/205
[58] Field of Search ............... 210/205, 219, 521, 522, 210/6, 7, 195.1, 195.3

[56] References Cited

U.S. PATENT DOCUMENTS

| 3,053,390 | 9/1962 | Wood | 210/219 X |
|---|---|---|---|
| 3,204,768 | 9/1965 | Daniel | 210/219 X |
| 3,207,314 | 9/1965 | Pearson | 210/219 X |
| 3,487,937 | 1/1970 | Koulovatos | 210/195.3 |
| 3,709,363 | 1/1973 | Smart et al. | 210/195.3 |
| 3,951,817 | 4/1976 | Snyder | 210/521 |
| 3,990,974 | 11/1976 | Sullins | 210/522 X |

Primary Examiner—Thomas G. Wyse
Attorney, Agent, or Firm—Lowe, Kokjer, Kircher, Wharton & Bowman

[57] ABSTRACT

Wastewater is directed into an aerobic treatment tank which is divided by a partition into an aeration chamber and a settling chamber. The waste material is aerated in the aeration chamber and then directed into the settling chamber. Any solids in the settling chamber settle out and are pumped back into the aeration chamber through a sludge return conduit wherein the returning sludge is saturated with air. The treated liquid is discharged to a drainage area in a colorless, odorless form. The pipes which direct the liquid through the tank are oriented to impede the passage of solids through the system, thereby keeping the solid wastes in the aeration chamber.

8 Claims, 4 Drawing Figures

U.S. Patent  Jan. 6, 1981  4,243,521
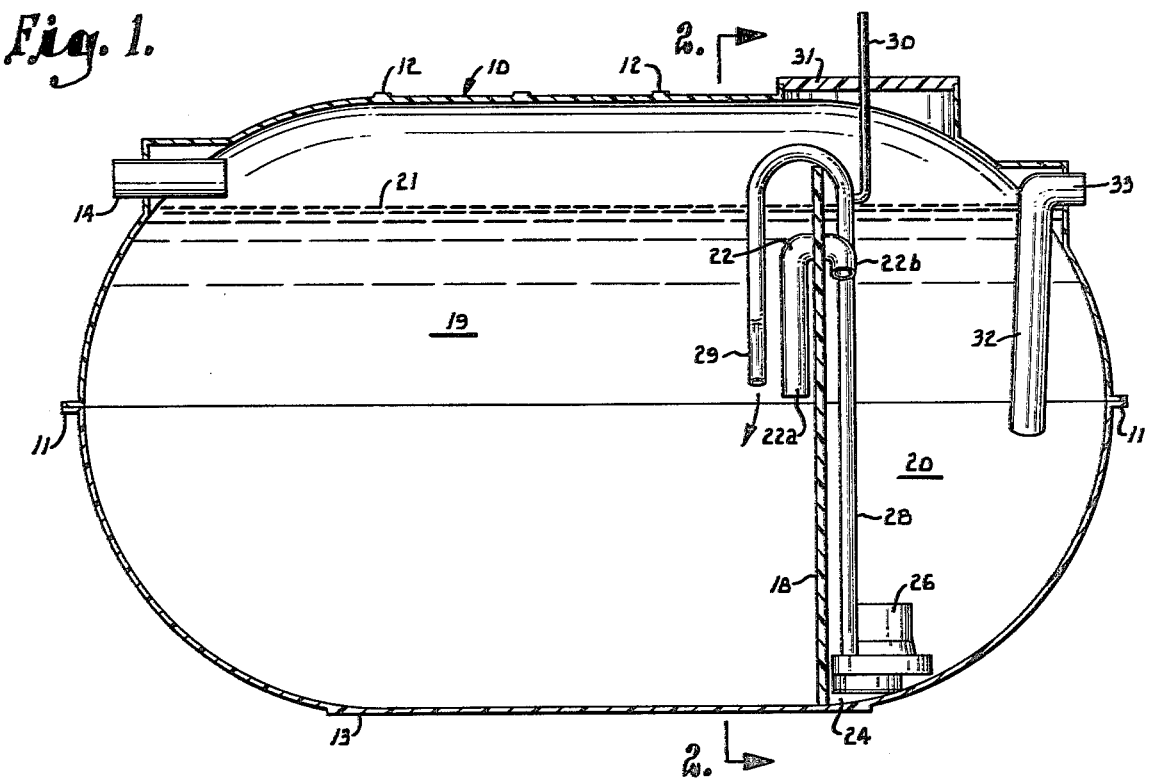
Fig. 1.
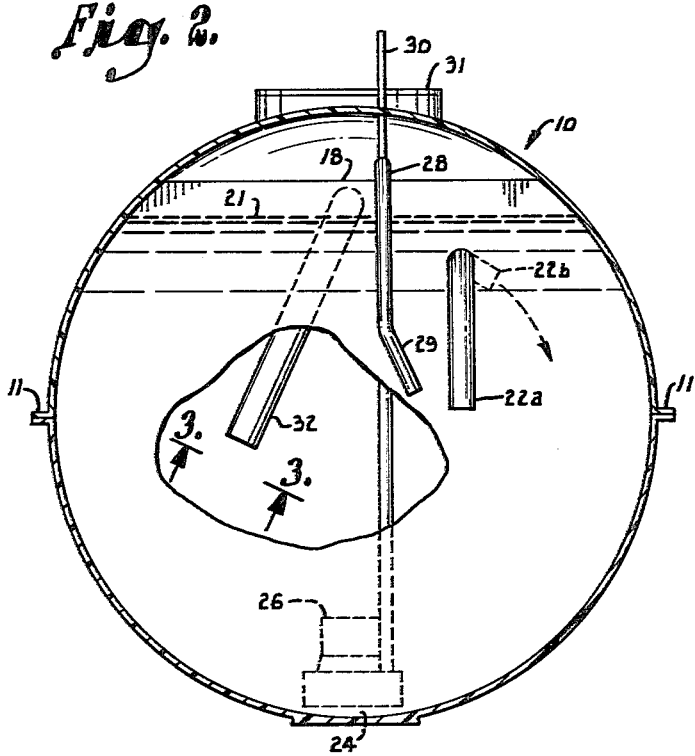
Fig. 2.
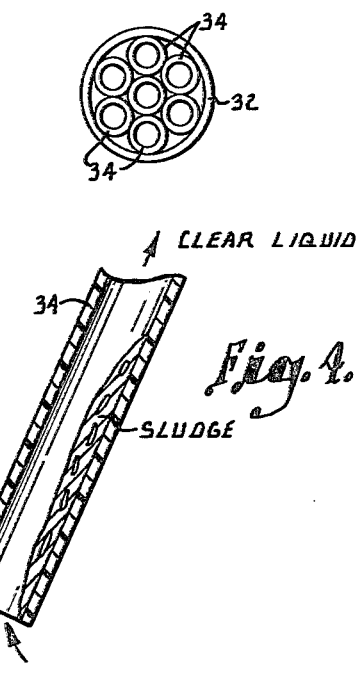
Fig. 3.
Fig. 4.
CLEAR LIQUID
SLUDGE
ENTRANCE OF SOLIDS

METHOD AND APPARATUS FOR AEROBICALLY TREATING WASTEWATER

BACKGROUND AND SUMMARY OF THE INVENTION

This invention relates generally to the treatment of sewage and more particularly to an improved method and apparatus for aerobically treating wastewater.

In the past, it has been common for septic tanks to be used in places remote from public sewers. Use of the septic tank and its anaerobic process often results in the emission of offensive odors and additional problems such as the tendency for partially treated sewage to discharge into the soil and to contaminate ground water. Maintenance and periodic cleaning of septic tanks have been difficult, time consuming and unpleasant tasks.

Although wastewater has been aerobically treated in multi-compartmented septic type tanks, such tanks have also been less than satisfactory in a number of respects. The principal difficulty has been to achieve thorough mixing of the waste materials with oxygen and aerobic bacteria, which is essential if the solid wastes and organic materials contained in the wastewater are to be effectively treated. Existing tanks do not achieve sufficient mixing and aeration to prevent escape of substantial amounts of solid waste materials and dissolved organic substances into the drainage field. In addition, the inefficient manner in which oxygen is supplied necessitates that the aeration device operate for long periods, thereby consuming large quantities of power.

Another major problem with some existing aerobic treatment tanks results from the lack of aeration of the primary compartment into which the wastewater flows. Offensive odors are emitted from the primary compartment if it is not adquately aerated so that the aerobic organisms can break down the odor causing the wastes. The primary compartment may function as a small septic tank with the limitation of septic tanks. Existing tanks may also provide a number of separate treatment compartments of various sizes, thus complicating the structure and significantly increasing the costs. Further, the primary compartment is usually too small to store large quantities of sludge or solids from the incoming sewage, and the capacity of the system suffers accordingly.

Most home treatment systems of the aerobic type rely on gravity flow of sludge from the clarification zone back into the aeration zone. The resultant accumulation of large amounts of sludge in the clarification zone inherently results in at least some of the sludge being carried out of the tank by the discharging liquid. Perhaps even more importantly, the accumulated sludge tends to clog or block the gravity return path of the sludge which is the same path the liquid flowing from the aeration zone to the clarification zone must travel. The liquid flow thus opposes the return flow of sludge such that both flows are impeded, resulting in sludge being entrained by the liquid and swept into the clarification zone then into the tank discharge.

Systems which treat wastewater in batches, as exemplified by the Kelsey U.S. Pat. No. 3,834,536, are inefficient as compared to flow thru type system tanks wherein the outflow rate approximates the inflow rate to the systems. (Rates of inflow as outflow affected by large tank volume, baffle, etc.) In a batch process, there is a rather high rate of discharge from the tank at times when there may be no incoming liquid and, conversely, there is no discharge at other times when there may be a substantial quantity of wastewater entering the tank. Consequently, there is no consistency of the flow rates and aerobic treatment as occurs in the flow thru type tank. Moreover, the relatively high discharge rate that periodically occurs causes entraining of solid wastes by the outflowing liquid and thus carries considerable quantities of waste material out of the tank and into the discharge or drainage field.

Aside from their ineffectiveness in treating sewage, systems such as that of the aforementioned Kelsey patent are overly complicated in that two or more pumps are required. Also, complex valve arrangements and electrical controls are necessary to achieve the intended manner of intermittent or batch operation. Another problem with this type of system is that sludge is able to build up in substantial quantities in the settling zone from which liquid is discharged directly to the drainage field. Because there is a pump disposed in the aeration zone, special structures such as wire cages or similar costly devices are necessary in order to prevent rags and heavy solids from reaching the pump and possibly jamming or otherwise damaging it.

In view of these and other problems associated with existing systems for treating sewage, it is apparent that there is a need to treat wastewater in a more efficient and effective manner. It is the primary goal of the present invention to meet that need.

More specifically, it is an important object of the invention to provide a method and apparatus for treating wastewater wherein solids that enter the clarification chamber settle out and are positively pumped back into the aeration chamber. Accordingly, there is no substantial build up of sludge in the clarification zone and the liquid that is discharged to the drainage field is free of solid waste. In addition, the drawbacks of gravity return are avoided.

Another important object of the invention is to provide a method and apparatus for treating wastewater which achieves thorough mixing and aeration of the waste material in the aeration chamber. The high degree of mixing and the efficiency of the aeration brings the oxygen and aerobic bacteria into intimate contact with the organic waste materials, thereby enhancing the aerobic process which oxidizes and breaks down the wastes. Energy is conserved because the aeration device needs to operate for only short periods due to the efficiency of the aeration.

Still another object of the invention is to provide a method and apparatus of the character described wherein solids and organic materials are able to pass into the settling or clarification zone in only small amounts. This maintains the clarification zone in a substantially solid free condition so that only clear, odorless liquids are discharged to the tile field. Any solids that do enter the clarification zone tend to settle to the floor where they are positively pumped back into the aeration chamber retained in the system and subjected to further aerobic treatment.

A further object of the invention is to provide a method and apparatus of the character described in which the solid waste materials are saturated with air as they are being pumped back into the aeration zone.

An additional object of the invention is to provide a method and apparatus of the character described wherein the sludge return path from the settling zone to the aeration zone is separate from the liquid flow path from the aeration zone to the settling zone. Unlike gravity flow systems, the flow paths are separate and are thus not counter to one another. As a result, there is no possibility of the flows impeding one another or of the returning sludge being swept into the settling zone by counterflowing liquid.

A still further object of the invention is to provide a method and apparatus of the character described wherein a flow thru treatment system is employed. Liquid is tested and discharged over a more continuous time frame with outflow from the system occuring anytime there is an inflow of wastewater. The advantages of the batch type process are thus avoided.

Yet another object of the invention is to provide a sewage treatment system having a tank divided into only two compartments and presenting a large aeration chamber which is completely and efficiently aerated and mixed. In addition, the primary (aeration) compartment is adequately sized to store accumulated solids from treated waste.

A further object of the invention is to provide a sewage treatment system that employs only a single pump and requires no complicated valves or complicated electrical controls. The pump is disposed in the settling zone where it is isolated from rags and heavy solids without the need for cages or other special structures.

An additional object of the invention is to provide a sewage treatment system in which the flow patterns in the aeration and settling chambers plus transfer devices between these chambers impede the passage of solids through the system.

Still another object of the invention is to provide a sewage treatment apparatus which is simple and economical to construct and which is particularly suited for the treatment of household wastes.

Other and further objects of the invention, together with the features of novelty appurtenant thereto, will appear in the course of the following description of the drawings.

DETAILED DESCRIPTION OF THE INVENTION

In the accompanying drawings which form a part of the specification and are to be read in conjunction therewith, and in which like reference numerals are employed to indicate like parts in the various views:

FIG. 1 is a side elevational view in section of a sewage treatment tank constructed in accordance with a preferred embodiment of the present invention.

FIG. 2 is a sectional view taken generally along line 2—2 of FIG. 1 in the direction of the arrows, with a portion of the partition broken away for purposes of illustration;

FIG. 3 is a fragmentary view on an enlarged scale taken generally along line 3—3 of FIG. 2 in the direction of the arrows showing the tube settler arrangement for controlling solids and retaining solids in the system; and FIG. 4 is a schematic and enlarged cross-section of one of the tubes in the settler arrangement shown in FIG. 3.

Referring now to the drawing in more detail, numeral 10 generally designates a fiberglass tank in which sewage is treated aerobically in accordance with the present invention. The tank 10 has a generally cylindrical body and is smoothly rounded on both ends. The tank is formed from upper and lower halves which are secured together by means of mating flanges 11 formed on the tank halves. A series of ribs 12 extend along the outside wall of the tank to provide increased structural strength. The tank is thickened and flattened on its bottom to provide a base structure 13.

Wastewater id delivered to the tank through an inlet pipe 14.

A baffle or partition 18 is mounted in a vertical position in tank 10 to separate the same into an aeration chamber 19 and a clarification or settling chamber 20. The partition is located off-center in the tank so that the aeration chamber 19 is much larger than the settling chamber 20. The tank thus presents a large capacity aeration compartment for receiving and storing and treating the incoming waste materials. The upper edge of partition 18 is located below the top of tank 10 but above the liquid level in the tank (designated by numeral 21), to allow access to both compartments from the tank manhole.

Liquid is transferred from the aeration chamber 19 to the settling chamber 20 through transfer pipe 22 which extends through the partition 18 at a location near its upper end. As shown in FIG. 2, pipe 22 is located to one side of the vertical center line of the partition. An inlet end portion 22a of pipe 22 is located in chamber 19 and is vertical and transfers liquid from approximately mid-depth of the tank. As will be explained in more detail, this orientation impedes the entry of solids into pipe 22.

An outlet end portion 22b of pipe 22 is located in the settling chamber 20 and is inclined slightly. Accordingly, liquid passing into chamber 20 from pipe 22 is discharged in a direction to impart a gentle swirling motion to it.

A sump region 24 is provided in chamber 20 to collect solid materials which settle in the settling chamber. The sump 24 is located adjacent to the bottom of partition 18. The sludge which settles out of the liquid slides down the side wall surface of chamber 20 and down the end wall surface such that it tends to collect in the sump region.

Sludge that accumulates in the sump 24 is returned to the aeration chamber 19 by a conventional electrically driven submersible pump 26. The pump is preferrably of the recessed impeller or open impeller type which is constructed such that solids pass through its impeller without jamming or clogging the pump. The pump 26 is controlled in a conventional manner by a remote timer (not shown) control and may be energized periodically to operate for preselected time intervals.

The sludge in chamber 20 is forced by pump 26 through a sludge return conduit 28 which extends upwardly and is curved over the top edge of partition 18 and into the aeration chamber 19. The outlet end portion 29 of conduit 28 is close to the inlet 22a of pipe 22. The material discharging through portion 29 thus tends to sweep solids away from the inlet to pipe 32.

A vertical air tube 30 extends from connection with an eductor unit installed in conduit 28 near the water surface 21, and has an open top end which is disposed above the tank in communication with the atmosphere. When pump 26 is in operation to pump sludge material through conduit 28, air is drawn into the open top end of tube 30 by aspiration and is supplied to the sludge that is flowing through the return conduit 28. A manhole cover 31 is located directly above the top edge of partition 18 and may be removed to provide ready access to the aeration device and the pump assembly for inspection and repair purposes.

Treated liquid is discharged from the settling chamber 20 through a specially constructed tube type settler, pipe 32. A horizontal pipe 33 connects with pipe 32 and extends out of the tank to deliver the treated liquid to a tile field or other drainage area. Pipe 33 is located at substantially the same height as the liquid level 21. The bottom or inlet end portion of pipe 32 is inclined in a direction to oppose the direction of the gently swirling liquid in chamber 20, thereby impeding the entry of solids into the outlet pipe.

The inclined lower end portion of pipe 32 is provided with a tube settler arrangement best shown in FIG. 3. A plurality of small tubes 34 are disposed within the pipe and are arranged side by side adjacent to one another. The tubes 34 assist in removing solids from the discharging liquid, as will be more fully explained.

In use, sewage is delivered to tank 10 through the inlet pipe 14 and is discharged into the aeration chamber 19. The material in chamber 19 is aerated by the air that is supplied to the sludge return from the eductor in conduit 28 and also by the air contained in the tank above the liquid level. The aeration effect is enhanced by the thorough mixing that results from the swirling motion of the liquid and the high velocity discharge from the end portion 29 of pipe 28. Consequently, the solids and organic materials dissolved in the liquid are thoroughly mixed with the air and the aerobic organisms, and the waste is thereby aerobically treated by organisms removing oxidizing or breaking down the solids and organic substances in the wastewater.

The aerobically treated liquid flows from chamber 19 into chamber 20 through the transfer pipe 22. Due to the location and orientation of the inlet 22a, the solids in the aeration chamber are swept past pipe 22 and are unable to enter inlet 22a in any appreciable quantity. In addition, the high velocity discharge from the location of the outlet 29 of conduit 28 near the inlet to pipe 22 causes the returning sludge to assist in diverting solids away from the transfer pipe 22. Therefore, the material entering the settling chamber 20 is substantially all liquid with some biological solids which have been aerobically treated in an effective manner due to the thoroughness of the aeration to which they are subjected in chamber 19.

Biological solid materials that do manage to enter chamber 20 settle out of the liquid. The solid materials slide down the walls of chamber 20 and are thus directed into the sump region 24. Pump 26 then pumps the sludge through conduit 28 where it is saturated with air supplied by air tube 30 in response to the flow of material through the eductor in the sludge return conduit. The aerated sludge along with ample amounts of excess educted or aspirated free air are then discharged into the aeration chamber 19 where the sludge is subjected to further aerobic treatment. As a result, virtually all of the solids that make their way into chamber 20 are mechanically pumped out of the settling chamber so that they cannot escape through the outlet pipe 32.

The treated liquid in chamber 20 discharges through pipe 32 and 33 in response to the entry of liquid into the tank through pipe 14. Since the liquid in chamber 20 is swirling gently in a direction opposite the orientation of the inclined inlet end of pipe 32, solids are swept past pipe 32. Any solids that do enter pipe 32 tend to accumulate on the lower edges of the tubes 34 (See FIG. 4). The solids that enter tubes 34 quickly impact against the internal tube surfaces due to their inclined orientations. The solid material then slides back down the tubes and into the settling chamber where it settles out and is removed by the pump 26. Virtually no solid wastes escape to the drainage field, and the discharging liquid is well treated, colorless and odorless.

It is pointed out that aeration is achieved in three different fashions. The sludge that is pumped through the return conduit 28 is saturated with air and thus aerated in a highly effective manner. Also, the excess or free air that is discharged from conduit 28 with the sludge is thoroughly mixed with the wastewater in the aeration chamber 19. Finally, the air above the turbulent liquid in chamber 19 enters the surface of the liquid to provide additional aeration via "surface aeration".

From the foregoing it will be seen that this invention is one well adapted to attain all ends and objects hereinabove set forth together with the other advantages which are obvious and which are inherent to the process or method.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A process of treating wastewater comprising the steps of:
    directing the wastewater to an aeration chamber;
    aerating the wastewater in said aeration chamber to aerobically treat same;
    transferring the aerobically treated wastewater to a settling chamber wherein the sludge settles;
    pumping the sludge through a sludge return passage extending from said settling chamber to said aeration chamber to return the sludge to the aeration chamber for further aeration therein;
    drawing outside air into said sludge return passage by aspiration effected by the flow of sludge through said passage, thereby mixing the outside air with the sludge before the sludge reaches the aeration chamber; and
    discharging the aerobically treated wastewater from said settling chamber to a drainage area.

2. A process as set forth in claim 1, wherein said drawing step comprises drawing the outside air into said sludge return passage at a location within the settling chamber.

3. A process as set forth in claim 1, wherein:
    said transferring step comprises passing the wastewater through a conduit extending between the aeration and settling chambers and having an inlet in the aeration chamber; and
    said pumping step includes discharging the sludge and outside air into said aeration chamber in proximity to said inlet of the conduit to divert solid materials in said aeration chamber away from said inlet.

4. Apparatus for aerobically treating wastewater comprising:
    a tank having an inlet for receiving wastewater and an outlet for discharging treated liquid;
    partition means separating said tank into an aeration chamber communicating with said inlet and a settling chamber communicating with said outlet;

aeration means for effecting aeration of the wastewater in said aeration chamber to aerobically treat same;

a transfer conduit extending from said aeration chamber to said settling chamber to direct treated liquid therebetween;

means defining a sump region in said settling chamber for receiving sludge;

a sludge return conduit having an intake end disposed in said sump region and a discharge end disposed in said aeration chamber;

a pump disposed in said settling chamber and operable to pump sludge into said intake end of the return conduit and through the return conduit from said sump region to said aeration chamber for aeration therein; and means for supplying air to said sludge return conduit to aerate the sludge flowing therethrough.

5. Apparatus as set forth in claim 4, wherein said air supplying means comprises an air tube communicating with said return conduit and having an inlet end disposed to receive outside air, said air tube being arranged to supply outside air to said return conduit by aspiration through the tube in response to the flow of material through said return conduit.

6. Apparatus as set forth in claim 5, wherein said air tube connects with said sludge return conduit at a location within the settling chamber.

7. Apparatus as set forth in claim 5, including an inlet to said transfer conduit disposed in said aeration chamber in proximity to the discharge end of said sludge return conduit at a location wherein the material flowing out of the discharge end of said return conduit impedes entry of solids into the inlet of said transfer conduit.

8. Apparatus as set forth in claim 4, wherein:
said transfer conduit presents an inlet in said aeration chamber; and
said air supplying means includes a pipe adapted to receive outside air and having a discharge end located in said aeration chamber in proximity to said inlet of the transfer conduit at a position wherein material passing out of said discharge end diverts solid materials in said aeration chamber away from said inlet of the transfer conduit.

* * * * *